(12) United States Patent
Peeters et al.

(10) Patent No.: US 7,232,229 B2
(45) Date of Patent: Jun. 19, 2007

(54) LASER-BASED DISPLAY WITH POSITION SENSITIVE DETECTOR

(75) Inventors: Eric Peeters, Fremont, CA (US); Noble M. Johnson, Menlo Park, CA (US); Ross D. Bringans, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 326 days.

(21) Appl. No.: 11/016,062

(22) Filed: Dec. 17, 2004

(65) Prior Publication Data

US 2006/0132716 A1    Jun. 22, 2006

(51) Int. Cl.
G03B 21/00    (2006.01)
G03B 21/56    (2006.01)

(52) U.S. Cl. ...................... 353/122; 359/449
(58) Field of Classification Search ............ 353/31, 353/69, 85, 122, 29; 348/744; 250/584; 359/449; 345/8; 362/259
See application file for complete search history.

(56) References Cited

U.S. PATENT DOCUMENTS

| | | | |
|---|---|---|---|
| 6,594,090 B2 | 7/2003 | Kruschwitz et al. | |
| 6,607,287 B1 | 8/2003 | Ayala, Jr. et al. | |
| 6,832,724 B2 * | 12/2004 | Yavid et al. | 235/454 |
| 2003/0222849 A1 * | 12/2003 | Starkweather | 345/156 |

* cited by examiner

Primary Examiner—Melissa J Koval
(74) Attorney, Agent, or Firm—Bever, Hoffman & Harms, LLP; Patrick T. Bever (57) ABSTRACT

A display apparatus includes a luminescent screen having pixels formed from blue, green and red luminescent material that are selectively activated by a laser beam to generate a full color image. The display utilizes a closed loop laser scanning/modulating arrangement in which a Position Sensitive Device (PSD) located next to the screen is used to determine the location of the impinging beam, and to transmit timing/location data to the laser addressing system. The laser addressing system uses the timing/location data to adjust and/or modulate the laser beam, thereby generating high-energy beam pulses that activate the selected pixels. The PSD includes vertical strips located along the side edges of the screen, or a sheet that is located behind the screen and accessed, for example, by way of slits or apertures formed in the screen material. The PSD sheet is coupled to an optional power source to form a photon-multiplication device.

18 Claims, 6 Drawing Sheets

LASER-BASED DISPLAY WITH POSITION SENSITIVE DETECTOR

FIELD OF THE INVENTION

The present invention relates to display devices, and more particularly to laser-based display devices.

BACKGROUND OF THE INVENTION

Conventional displays are currently produced in several technology types, including cathode-ray tube (CRT), light emitting diode (LED), liquid crystal displays (LCDs), and projection display systems. CRT displays utilize a vacuum tube and an electron beam source mounted behind a luminescent screen to generate an image. LED displays include an array of light emitting pixels that are individually addressed by an active or passive backplane (addressing circuitry) to generate an image. Projection display systems utilize a projection device that projects an image onto a passive, typically white screen, which is reflected back toward an audience.

Large area display applications (e.g., greater than 60") are most commonly implemented using projection display technology due to their lower cost and power consumption. CRT and LED displays are typically cost effective to product and operate when relatively small in size, but are typically too heavy and/or require too much power to operate when produced in a large area display format. In contrast, projection display systems are more easily scalable to larger area formats simply by increasing the size of the relatively low-cost, light weight screen, and increasing the size of the image projected on the screen.

Projection displays include arc lamp displays and laser-based projection displays. Early projection display systems used a white light source, such as a xenon arc or halogen lamp, that illuminates one or more light valves or spatial light modulators with appropriate color filtering to form the projected image, thus facilitating the production of relatively inexpensive, scalable, low-power, large area displays. However, such arc lamp projection displays are often criticized because of poor picture sharpness, a small viewing angle, and because the projected picture is readily "washed out" by bright ambient light. More recently, laser-based projection displays have been introduced that operate in a manner similar to arc lamp projection displays, but avoid the picture quality issues by utilizing relatively bright red, green and blue laser beams to generate much higher quality projected images. A fundamental problem with large-area laser-based displays, however, is the laser power that is required to generate a suitable picture. The power required (e.g. >1 W) is well beyond that which is considered safe in consumer applications. In addition, inexpensive lasers with sufficient power are not yet available, especially at the green and blue wavelengths, thus making laser-based displays significantly more expensive than arc lamp displays. Moreover, even high-powered displays become washed out in high ambient light due to their use of white screens (which are used to limit the required laser brightness). Dark or black screens may be used to prevent this washout problem, but this only increases the power requirements on the lasers, making the overall display system impractically expensive.

What is needed is a scalable, large area display apparatus that provides a picture equal to or greater than state of the art laser-based projection displays, but is less expensive to produce and operate, and avoids the safety concerns associated with the use of high powered lasers.

SUMMARY OF THE INVENTION

The present invention utilizes a luminescent screen and a closed loop laser addressing system to provide a scalable low-cost display apparatus. The luminescent screen includes an array of red, green, and blue pixels formed from dyed or otherwise colored luminescent material (e.g., phosphor) that are activated (addressed) by a modulated laser beam generated by the laser addressing system. The laser addressing system scans a visible, near ultra violet (near-UV) or UV laser beam over the screen, and modulates the beam energy to activate the luminescent material of selected pixels, thereby causing the luminescent material to emit visible light that produces a desired image. Because the laser beam is not image forming in itself, a single inexpensive laser (or a small number of parallel lasers having nominally the same wavelength, or different wavelengths) may be used to generate color images, thus avoiding the relatively expensive multi-colored laser arrangements required in conventional laser-based projection displays.

According to an aspect of the present invention, a Position Sensitive Detector (PSD) is utilized to facilitate the closed loop laser addressing operation. The PSD includes a sensor that is provided on or next to the screen, and a detector circuit that is connected to the sensor and facilitates the laser scanning and/or modulating operation by determining the beam's location relative to the screen based on information received from the sensor, and by generating real time timing/location data that is transmitted back to the scanning/modulating mechanism of the laser addressing system. In disclosed embodiments, differential currents generated in the sensor are utilized to detect the coordinates of the impinging laser beam, and these differential currents are converted into timing/location data that is transmitted to the laser scanning/modulating system. The thus-produced closed-loop laser control system avoids the need for precise alignment between the laser addressing system and the luminescent screen, and significantly relaxes the specification requirements (and thus the cost) of the scanning/modulating system over that required in an open-loop arrangement, thereby facilitating the production of cost-effective displays. Further, because pixel activation is reliably controlled by the closed loop laser addressing arrangement, the luminescent screen does not require an active or passive matrix backplane to address the light-emitting pixels, thus facilitating production of the display apparatus using low-cost screen printing and blanket coating techniques (as opposed to the photolithographic fabrication techniques required, for example, to produce the backplanes of LED displays). By avoiding the expense and size constraints associated with photolithographic fabrication techniques, the present invention facilitates the production of inexpensive display apparatus including luminescent screens that can be scaled from very small to very large (e.g., 60" or more).

In accordance with an embodiment of the present invention, the PSD sensor includes one-dimensional (1D) sensor strips mounted along the vertical edges of the luminescent screen to detect the laser beam's location at the start and end of each scan path. The 1D sensor strips detect the vertical location of the impinging beam, for example, by detecting differential currents at each end of the sensor strips. The differential currents are passed to the detector circuit, which generates location data that identifies the detected beam's location. The location data is then transmitted by wire or wireless transmission (e.g., infrared) in real time to the laser scanning/modulating system. The laser scanning/modulating system which uses the data to register (aim) the laser beam and/or to modulate the laser beam's energy, thereby generating high energy pulses as the laser beam passes over the selected pixels. In addition to the side-located sensor strips, one or more 1D sensor strips may be utilized inside the active display area (e.g., mounted behind the screen).

In accordance with an embodiment of the present invention, the PSD sensor includes a conductive sensor sheet that is located behind the luminescent screen and connected along its edges to the detector circuit. Similar to the 1D sensor strips, the conductive sensor sheet provides two-dimensional (2D) location data by measuring first differential currents between the top and bottom edges, and second differential currents between the side edges. The 2D location data is used to modulate the laser beam to have a low energy level (i.e., such that it does not cause pixel activation) when the impinging beam is located on non-selected pixels, and to generate high-energy pulses (i.e., causing pixel activation) when the impinging beam impinges on selected pixels. In one specific embodiment, the laser beam passes through the luminescent screen to the PSD sensor sheet. In another embodiment, slits are formed in border regions separating spaced apart luminescent regions facilitate passage of the impinging beam to the PSD sensor sheet. In yet another embodiment, each pixel defines a central aperture for passing the impinging beam to the PSD sensor sheet.

In one embodiment, a PSD sensor sheet is utilized to form a photon-multiplication device that facilitates the production of large area displays by generating relatively high light emissions. The PSD sensor sheet is mounted on a photocathode plate, and the luminescent regions are mounted on a photoanode plate that is separated from the photocathode plate by a vacuum region. The photocathode plate includes a glass pane with the PSD sensor sheet formed on its inside surface, and a photocathode material formed on the sensor sheet. The photoanode plate includes a second glass pane having a second conductor layer formed on its inside surface, and a photoanode layer including blue, green, and red luminescent regions printed or otherwise formed on the second conductor layer. The photocathode layer and photoanode layer are coupled to voltage sources such that an electric field (E-field) is generated in the vacuum region. Instead of activating the luminescent material of a selected pixel directly, the laser beam activates a region of the photocathode layer located adjacent to the selected pixel. The activated photocathode region generates free electrons that are accelerated by the E-field and supply the luminescent material of a selected pixel with substantially higher energy than that of the laser beam, thereby producing an optical gain.

In yet other embodiments, the display apparatus of the present invention is utilized to produce highly efficient small screen displays.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

Figure 1:
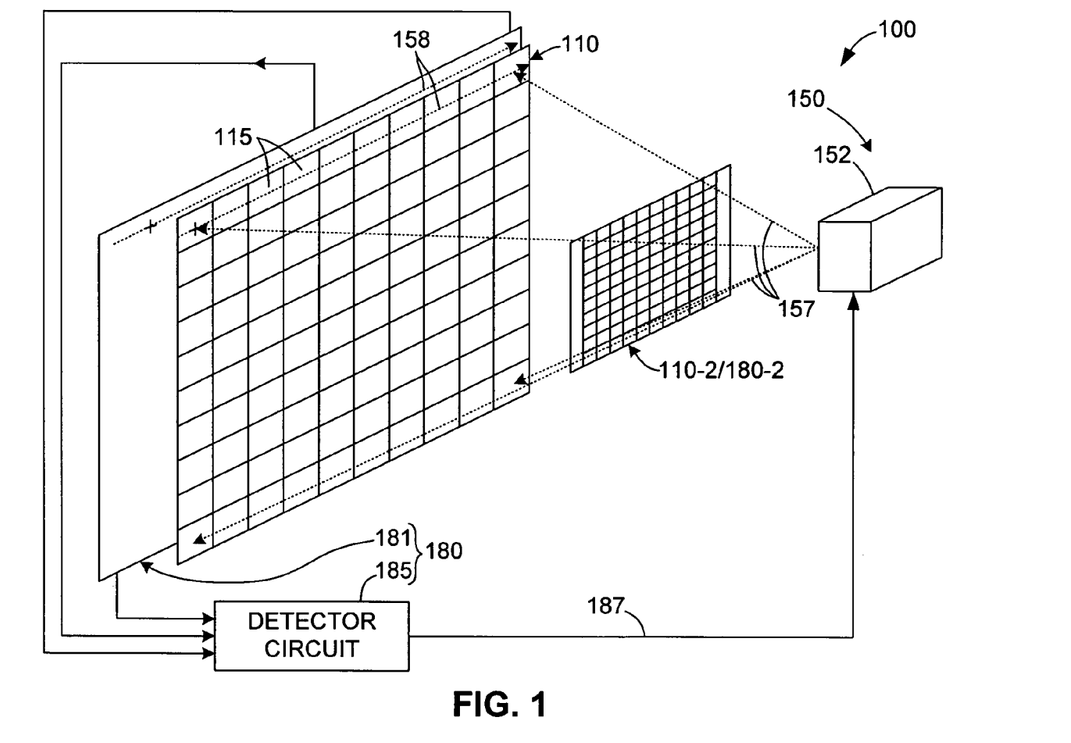
FIG. 1 is a perspective view showing a simplified display apparatus according to an embodiment of the present invention.

FIG. 1 depicts a simplified closed loop display apparatus 100 according to an embodiment of the present invention. Display apparatus 100 generally includes a luminescent screen 110, a laser addressing system 150, and a position sensitive detector (PSD) 180 that is mounted adjacent to luminescent screen 110 and transmits data on a signal path 187 to laser addressing system 150.

Luminescent screen 110 includes an array of pixels 115, each pixel including a region of dyed or otherwise colored (e.g., red, green, and blue) luminescent material that emit visible light when struck with a sufficiently high energy laser beam pulse (or as discussed below, electrons generated by a photon-multiplication device in response to such a laser beam pulse). In one embodiment, these red, green, and blue luminescent regions are formed using fluorescent quantum dot nanoparticles produced, for example, by NanoSys Inc. of Palo Alto, Calif. USA. An inexpensive fabrication method involves using such nanoparticles with clear polymer binder that is screen printed in three passes onto a thin carrier sheet. Similar approaches are possible using phosphors and appropriate dyes or pigments.

Laser addressing system 150 directs a laser beam 157 onto luminescent screen 110 and PSD 180, and modulates laser beam 157 in response to the data generated by PSD 180 such that relatively high energy pulses are transmitted to selected pixels 115 of luminescent screen 110, thereby causing luminescent screen 110 to generate a desired image. Laser addressing system 150 is similar to laser systems utilized in conventional laser-based displays in that laser system 150 includes a scanning/modulating apparatus 152 that raster scans laser beam 157 in a predetermined two-dimensional pattern across the pixel array of screen 110, and modulates laser beam 157 to selectively transmit high energy pulses to selected pixels 115. The scanning and modulating functions performed by scanning/modulating apparatus 152 are similar to those performed in conventional laser systems, and electromechanical systems utilized to provide these functions are therefore well known to those skilled in the art. Such systems may be formed, for example, using semiconductor lasers, collimation/focusing optics, two-dimensional (2D) scanning systems, and electronics for laser modulation that are well-known to those skilled in the art. Many implementations of 2D optical scanners are known in the art. One example of a suitable embodiment for a large projection TV type display apparatus might be a small spinning polygon mirror for the fast horizontal direction in combination with a micromachined galvo scanner operated in mechanical resonance for the slow vertical direction. Note that the scanner doesn't require any particularly tight specifications (e.g., linearity, angular accuracy, repeatability, drift, etc.) when a position sensitive device (described in detail below) is utilized to determine the location of the impinging beam. Such a scanner can be considered as the display equivalent of "reflex printing" in xerography, and could provide a very inexpensive type of scanner.

Figure 2:
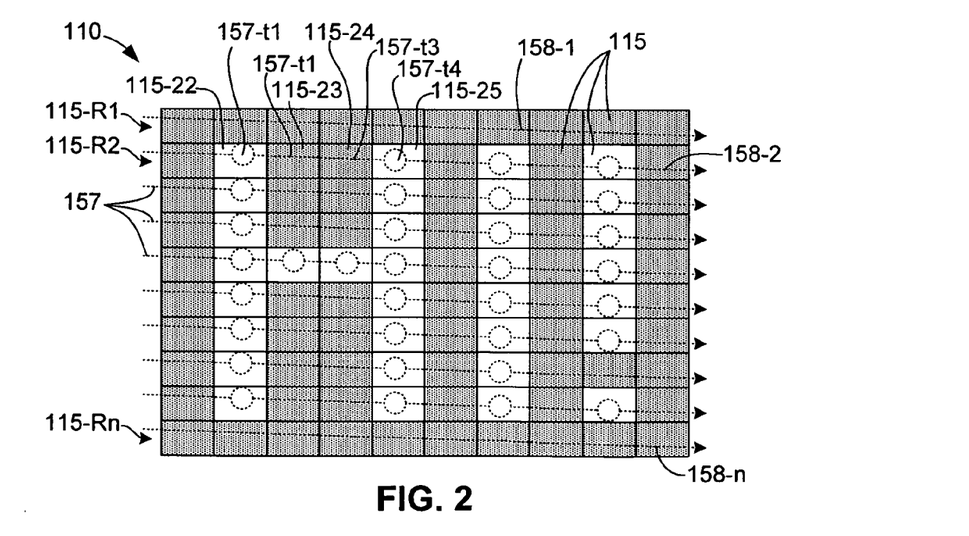
FIG. 2 is a front plan view showing a simplified luminescent screen of the display apparatus of FIG. 1.

FIG. 2 illustrates an exemplary raster scan pattern provided by scanning/modulating apparatus 152. The diagonal dotted lines indicate a sequential series of scan paths 158 traced by the laser beam across the surface of luminescent screen 110. For example, a first scan path 158-1 is traced by the laser beam from left to right across the uppermost row 115-R1 of pixels 115. The laser beam is then reset and traces a second left-to-right scan path 158-2 across a second row 115-R2. This reset/path-tracing process is repeated until the laser beam traces a scan path 158-n across a lowermost pixel row 115-Rn, at which point scanning/modulating apparatus 152 resets the laser beam, and the raster scan pattern is repeated.

FIG. 2 also illustrates modulation of the laser beam by scanning/modulating apparatus 152 to produce a desired image. As suggested above and described in additional detail below, photons provided by the laser beam are utilized to "activate" selected pixels by stimulating the luminescent material associated with the selected pixels. As such, modulation of the laser beam involves controlling the laser to transmit a relatively high-energy pulse as the laser beam scans across selected pixels, and turning off the laser (or transmitting a beam having insufficient energy to activate the luminescent material) when the laser beam scans across non-selected pixels. Referring to FIG. 2, selected pixels are white (indicating visible light emission), and non-selected pixels are relatively dark. As the laser beam is directed along scan path 158-2, the laser beam is modulated to generate high energy pulses in a time-based manner such that selected pixels in row 115-2 are activated. For example, the laser beam generates a high-energy pulse 157-$t1$ (i.e., laser beam 157 at a time t1) that impinges on pixel 115-22, thereby causing pixel 115-22 to activate and generate visible light. As the laser beam continues along scan path 158-2, the laser beam is turned off (or low) as it scans over pixel 115-23 (indicated by line 157-$t2$) and over pixels 115-24 (indicated by line 157-$t3$), thereby causing these pixels to remain dark (turned off). Then, when the laser beam reaches the next selected pixel (e.g., pixel 115-25), the laser beam is turned on to generate high energy pulse 115-$t4$, thereby causing pixel 115-24 to activate and generate visible light. By selectively modulating (turning on and off) the laser beam as it is scanned over luminescent screen 110, luminescent screen 110 is controlled to generate a desired image (e.g., as shown in FIG. 2, the message "HI!").

As set forth above, laser beam 157 is not image forming in itself, as in conventional reflective laser-based projection displays, but is merely used to address (i.e., produce local light emission from) selected pixels 115 of luminescent screen 110. Accordingly, by forming luminescent screen 110 to include red, green, and blue pixels (i.e., pixels having luminescent regions formed, for example, by red, green, and blue phosphor material), display apparatus 100 provides a full color display system in which laser addressing system 150 may be implemented using a single laser or small group of parallel lasers having nominally the same (e.g., violet, ultraviolet (UV), near-UV, or visible) wavelength. That is, unlike conventional reflective laser-based projection displays that require the use of red, green and blue lasers to produce a full color image, a single laser wavelength may be used to activate red, green and blue pixels of luminescent screen 110, thereby facilitating the use of a substantially lower cost laser system than that used in conventional laser-based systems.

According to another aspect of the present invention, by solely utilizing laser-addressing system 150 to activate selected pixels, luminescent screen 110 may be fabricated using inexpensive, high yield fabrication methods that facilitate scalability. In particular, similar to projection screens, luminescent screen 110 does not require an active or passive matrix backplane to address the light-emitting pixels. Accordingly, luminescent screen 110 can be produced by screen-printing the colored luminescent material, and blanket coating all other materials (e.g., photocathode and/or PSD layers). Thus, the size of luminescent screen 110 is not limited by whatever large-area processing equipment is available at the time, thereby avoiding the relatively high costs and low production yield associated with the use of such equipment. The present inventors believe that the absence of any kind of matrixed backplane, active or passive, and the absence of large-area processing lines to be kept up-to-date, might dramatically reduce the cost of luminescent screen 110 in comparison to conventional display alternatives. The cost advantage would only get larger for increasing screen sizes. Further, cost efficiencies arise from the ability to use a single laser system to implement displays of several sizes. For example, referring to FIG. 1, laser addressing system 150 can be utilized to address the relatively large luminescent screen 110, thus producing a relatively large display apparatus, or utilized to implement a relatively small display apparatus using a relatively small luminescent screen 110-2.

PSD 180 includes a sensor 181 mounted adjacent to luminescent screen 110, and a detector circuit 185 that is coupled between sensor 181 and laser scanning/modulating system 152. PSD 180 facilitates the laser scanning and/or modulating operation by determining the location that laser beam 157 impinges on sensor 181 (thus, the location of laser beam 157 relative to luminescent screen 110), and by generating real time timing/location data that is transmitted back to scanning/modulating mechanism 152 of laser addressing system 150. In various embodiments described below, detector circuit 185 generates the location data by measuring differential currents generated in sensor 181, which is formed from conductive material, and utilizing the differential current measurements to determine the coordinates of the impinging laser beam. This coordinate information is then converted into timing/location data by detector circuit 185, which is then transmitted by wired or wireless communication link 187 to laser-scanning/modulating system 152. The timing/location data is then processed by laser addressing system 150 (e.g., compared with stored bit-map data and image source data) to adjust the transmission path of laser beam 157 and/or to modulate the intensity of laser beam 157. The thus-produced closed-loop laser control system avoids the need for precise alignment between laser addressing system 150 and luminescent screen 110, and significantly relaxes the specification requirements (and thus the cost) of scanning/modulating system 152 over that required in an open-loop arrangement. Further, because pixel activation is reliably controlled by this closed loop laser addressing arrangement, luminescent screen 110 does not require an active or passive matrix backplane to address (activate) pixels 115, thus facilitating production of luminescent screen 110 using low-cost screen printing and blanket coating techniques (as opposed to the photolithographic fabrication techniques required, for example, to produce the backplanes of LED displays). By avoiding the expense and size constraints associated with photolithographic fabrication techniques, the present invention facilitates the production of inexpensive display apparatus including luminescent screens that can be scaled from very small to very large (e.g., 60" or more).

Figure 3:
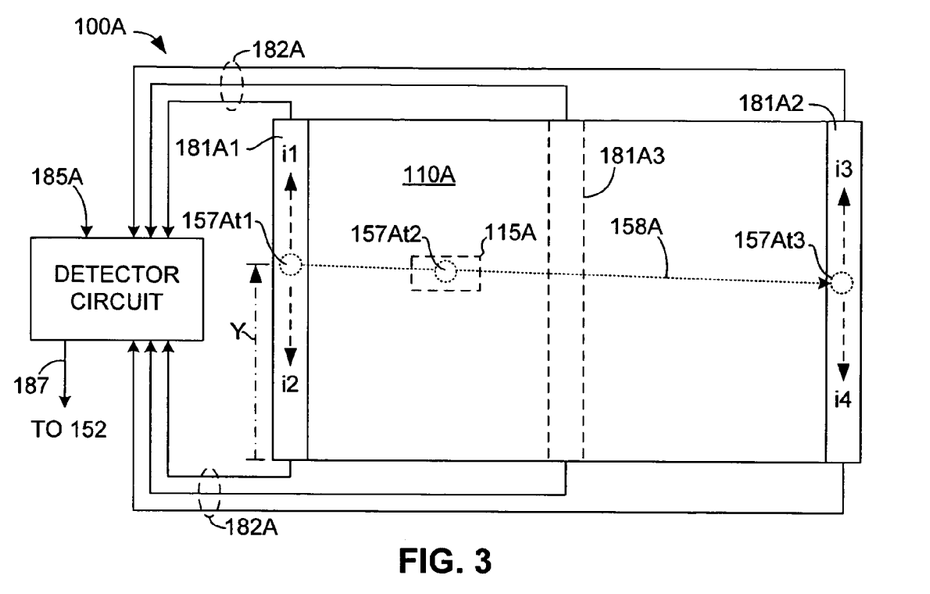
FIG. 3 is a front plan view showing a simplified position sensitive detector according utilized in the display apparatus of FIG. 1 according to an embodiment of the present invention.

FIG. 3 illustrates a simplified closed loop display apparatus 100A including a luminescent screen 110A and a PSD formed in accordance with an embodiment of the present invention. Luminescent screen 110A is constructed and operates substantially as described above. The PSD includes vertical, one-dimensional (1D) sensor strips 181A1 and 181A2 that are respectively aligned along the side edges of the active screen area (i.e., the pixel array area of luminescent screen 110A). Sensor strips 181A1 and 181A2 generate detection signals indicative of the timing and vertical location of laser beam 157 in the manner described below, and these detection signals are provided to an associated detector circuit 185A, which in turn processes the detection signals for transmission to scanning/modulating system 152 (discussed above). In particular, sensor strips 181A1 and 181A2 are utilized to respectively detect a start-of-scan (SOS) laser pulse 157At1 and an end-of-scan (EOS) laser pulse 157At3, which are generated by the laser system at the start and end of each laser scan (e.g., laser scan 158A indicated by dashed arrow). The vertical position of each SOS and EOS laser pulse is detected by the differential current generated in the sensor material when the beam's energy is transferred to sensor strips 181A1 and 181A2. For example, the vertical location of laser pulse 157At1 is determined by comparing differential currents "i1" and "i2", and the vertical location of laser pulse 157At3 is determined by comparing differential currents "i3" and "i4". Note that suitable information may be generated using only one sensor strip, and that the sensor strips may be aligned along the upper/lower edges of screen 110A when the laser beam is scanned in a vertical direction. By providing this location information and scan time information (i.e., the time required to scan across screen 110A), the laser addressing system is capable of generating a high-energy pulse 157At2 when the laser beam is aligned with a selected pixel 115A. One or more additional PSD strips (e.g., PSD strip 181A3) may be provided in the active screen area (e.g., behind screen 110A) to detect an intermediate beam pulse, thereby providing higher resolution timing/location data for more precise control of the laser addressing system. Suitable sensor material for this purpose includes amorphous silicon (a-Si:H) on a plastic base, fax bars (line of optical detectors), photoreceptor material, or other light sensing materials and devices known in the art. The differential currents are passed via conductors 182A to detector circuit 185A, which processes the signals according to known techniques to produce timing/location data, which is then transmitted to scanning/modulating system 152 via signal transmission path 187. Fast real-time communication between the screen and the scanner is needed in order to synchronize the laser modulation with the measured spot position. In some embodiments, signal transmission path 187 may be implemented using a wired communication link. In other embodiments, signal transmission path 187 may be implemented using an untethered solution, such as hi-speed free-space IR signal or other wireless technology.

Figure 4:
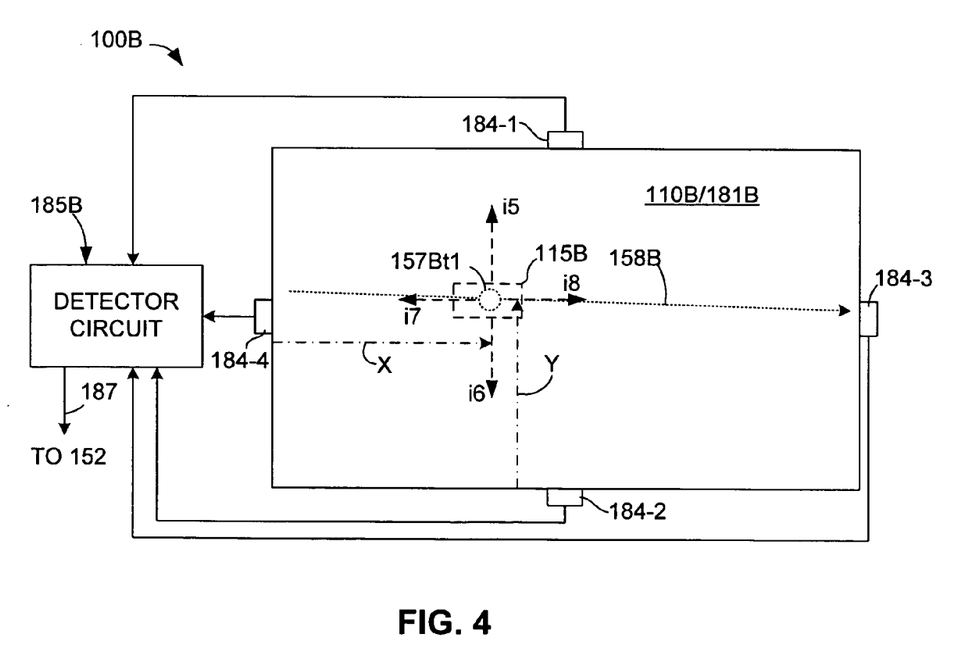
FIG. 4 is a front plan view showing a simplified position sensitive detector according utilized in the display apparatus of FIG. 1 according to another embodiment of the present invention.

FIG. 4 illustrates another simplified closed loop display apparatus 100B including a luminescent screen 110B and an associated PSD according to an embodiment of the present invention. In this instance, the PSD includes two-dimensional (2D) sensor sheet (layer) 181B that is positioned behind the active screen area of luminescent screen 110B (i.e., such that the active screen area is located between the laser addressing system and sensor sheet 181B. Luminescent screen 110B is constructed and operates substantially as described above, but is distinguished in that screen 110B is constructed such that it passes at least a portion of the laser beam energy transmitted during each scan path to sensor sheet 181B. In this embodiment, laser beam 157B is scanned at a relatively low energy level (i.e., an energy level that does not produce pixel activation), and selectively modulated to a relatively high energy level (i.e., an energy level that-produces pixel, thus causing the emission of visible light) when laser beam 157B is over a selected pixel. In one specific embodiment, electrodes 184-1 through 184-4 are located along the vertical and horizontal (top/bottom) edges of sensor sheet 181B. The instantaneous position of laser beam 157Bt1 is determined from the differential currents "i5" to "i8", which are generated in sensor sheet 181B and transmitted through electrodes 184-1 through 184-4 to detector circuit 185B, which in turn utilizes these signals to determine the 2D (e.g., X and Y) coordinates of beam pulse 157Gt1, and which transmits the corresponding timing/location data back to laser scanning/modulating system 152 via signal transmission path 187. When the 2D coordinates are identified by the image source data as corresponding to a selected pixel (e.g., pixel 115B, as shown in FIG. 4), laser beam 157Bt1 is modulated to a high energy by laser scanning/modulating system 152, thereby activating pixel 115B. Thus, the timing/location data is used to synchronize laser modulation with the beam position on luminescent screen 110B, thereby facilitating open loop (e.g., by causing the laser beam to overlap and cover the entire screen surface). This further reduces the specification requirements on laser scanning/modulating system 152, which further reduces its cost.

Figure 5A:
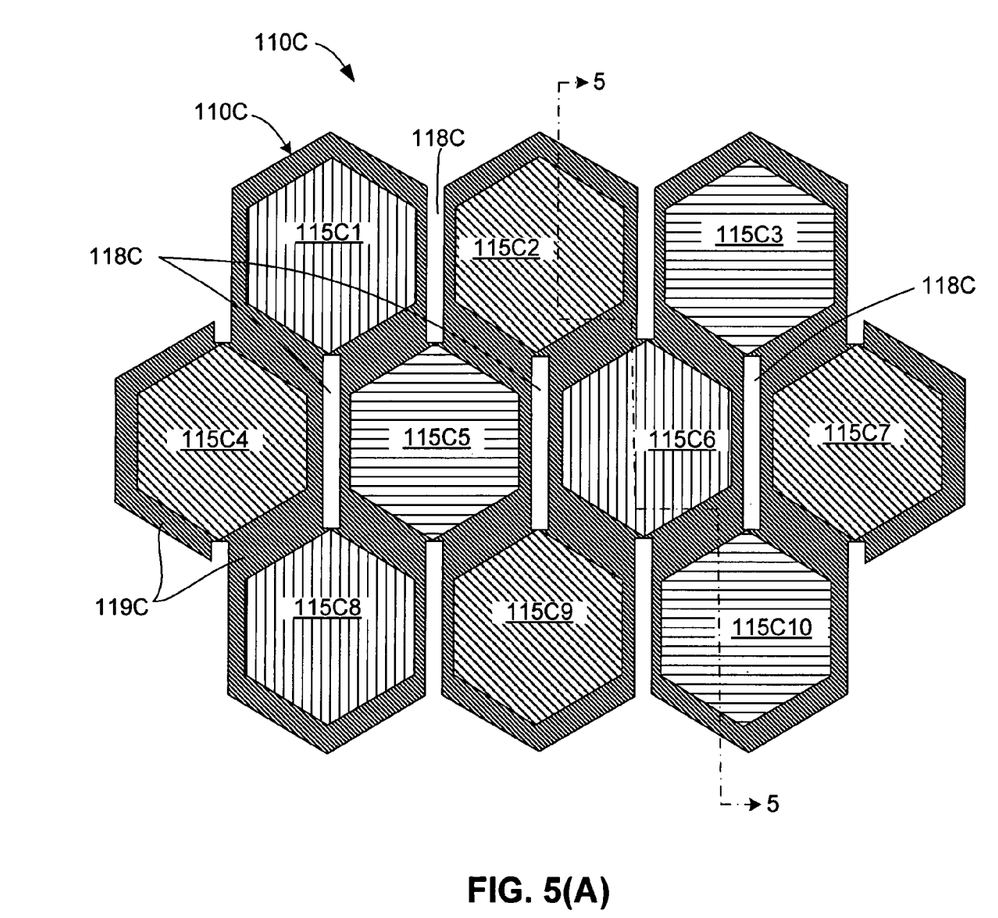
FIGS. 5(A) and 5(B) are enlarged front and cross-sectional side views showing a portion of an emissive screen including slits according to another embodiment of the present invention.
Figure 5B:
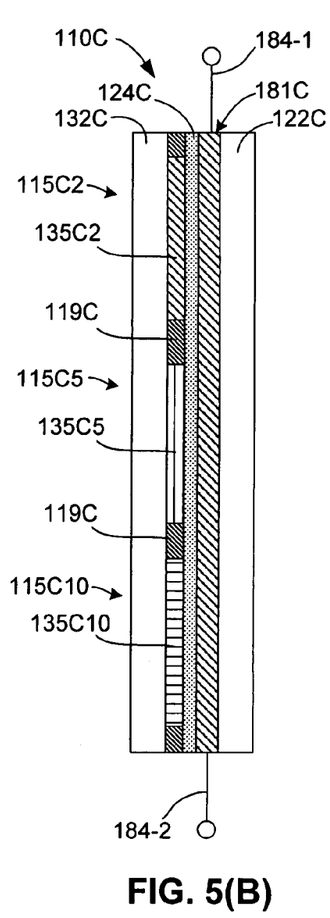

FIGS. 5(A) and 5(B) are front and cross-sectional side views showing a portion of a luminescent screen 110C and according to another embodiment of the present invention. Luminescent screen 110C includes spaced-apart hexagonal luminescent regions (pixels) 115C1 through 115C10. Note that pixels 115C1 through 115C10 are arranged such that red-colored luminescent regions 115C1, 115C6 and 115C8 are indicated by vertical lines, green colored pixels 115C2, 115C4, 115C7 and 115C9 are indicated by-diagonal lines, and blue-colored pixels 115C3, 115C5 and 115C10 are indicated by horizontal lines. In one embodiment compatible with conventional large-screen televisions or conference room projection systems, each pixel 135C1 through 135C10 is approximately 0.4 mm in diameter, and is spaced from its adjacent neighbors by a black (or other dark color) non-luminescent border region 119C approximately 0.1 mm in width, thus providing a pixel pitch of approximately 0.5 mm. As discussed above, the "blackness" of border region 119C is found to be directly proportional to the contrast, depth and dynamic range of images generated by emissive displays utilizing black pixel borders.

Referring to FIG. 5(B), luminescent screen 110C includes a rear plastic layer 122C, a PSD sensor sheet 181C formed on an inside surface of plastic layer 122C, a photocathode material (e.g., Mg) layer 124C formed on sensor sheet 181C, luminescent regions 135C2, 135C5, and 135C10 (which correspond to pixels 115C2, 115C5, and 115C10 of FIG. 5(A)) and intervening sections of non-luminescent border region 119C formed on photocathode material layer 124C, and a front plastic layer 132C formed over the front surface of luminescent regions 135C2, 135C5, and 135C10 and border region 119C. In one embodiment, the total thickness of luminescent screen 110C is between 1 and 2.5 mm.

Referring again to FIG. 5(A), according to an embodiment of the present invention, vertical slits 118C are defined in border region 119C adjacent to each hexagonal pixel 115C1 through 115C10 to facilitate passage of the impinging laser beam through sensor sheet 181C. That is, slits 118C represent material that is substantially transparent to the impinging laser beam, thereby facilitating the use of a lower power laser than that needed to penetrate a relatively less transparent material (e.g., luminescent regions 135C2, 135C5, and 135C10 or border regions 119C). The passed beam path portions are detected by sensor sheet 181C and utilized in the manner described above.

Figure 6A:
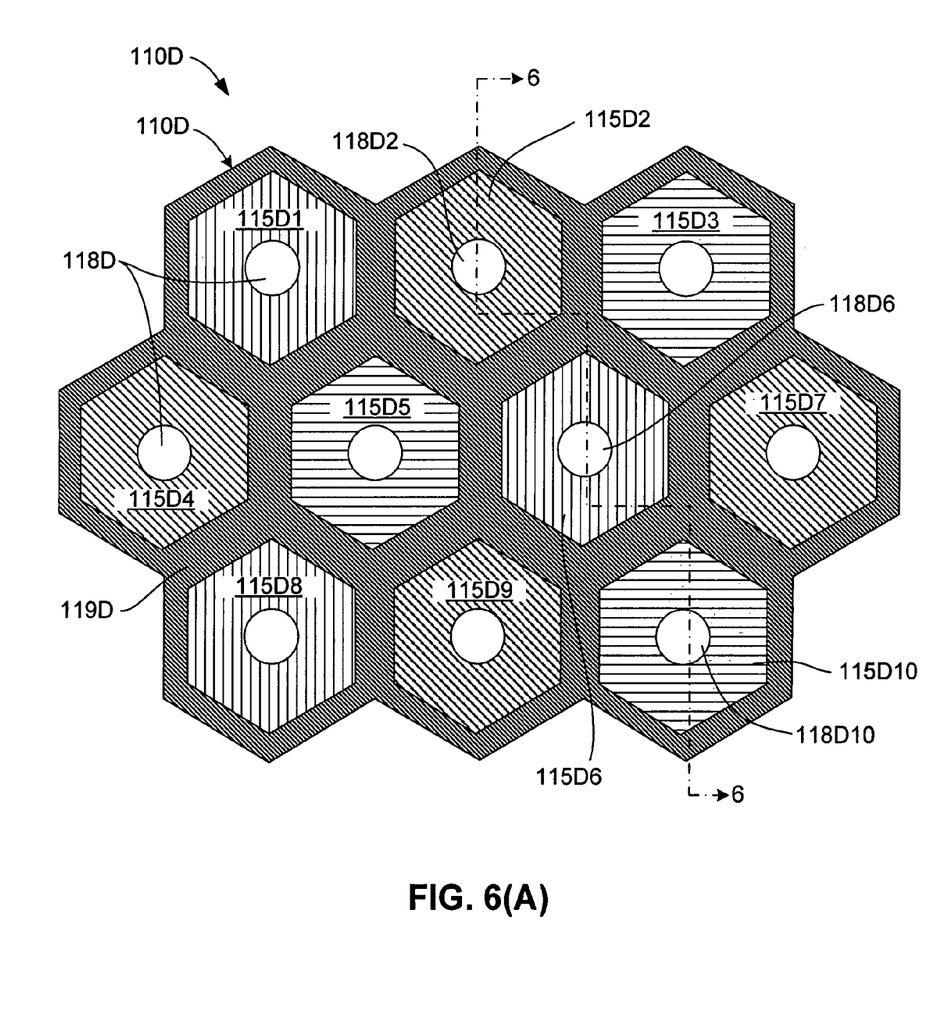
FIGS. 6(A) and 6(B) are enlarged front and cross-sectional side views showing a portion of an emissive screen including apertures according to another embodiment of the present invention.
Figure 6B:
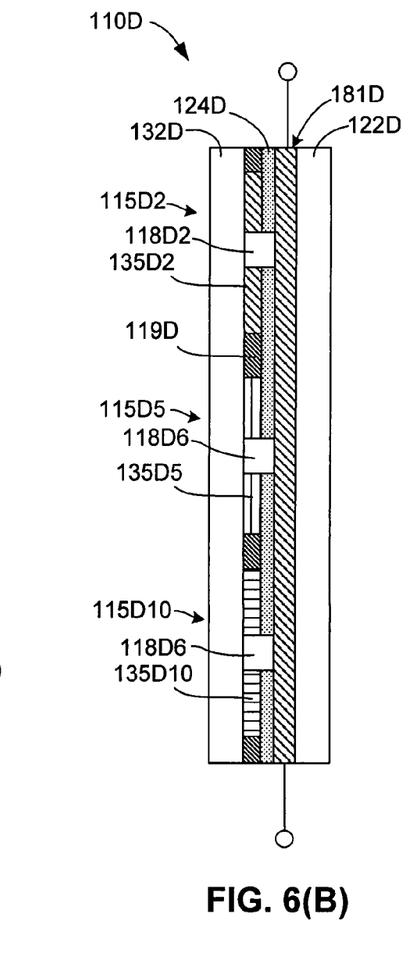

FIGS. 6(A) and 6(B) are front and cross-sectional side views showing a portion of a luminescent screen 110D and according to yet another embodiment of the present invention. Luminescent screen 110D is constructed essential as described in the previous embodiment to include spaced-apart hexagonal luminescent regions (pixels) 115D1 through 115D10 that are separated by a non-luminescent border region 119D in the manner described above. As indicated in FIG. 6(B), a PSD sensor sheet 181D is sandwiched between a rear plastic layer 122D and a photocathode material layer 124D. Luminescent regions 135D2, 135D5, and 135D10 (which correspond to pixels 115D2, 115D5, and 115D10 of FIG. 6(A)) and intervening sections of non-luminescent border region 119D are formed on photocathode material layer 124D, and a front plastic layer 132D is formed over the front surface of luminescent regions 135D2, 135D5, and 135D10 and border region 119D.

Referring again to FIG. 6(A), according to an embodiment of the present invention, each hexagonal pixel 115D1 through 115D10 defines a central aperture 118D to facilitate passage of the impinging laser beam through sensor sheet 181D. That is, as indicated in FIG. 6(B), apertures 118D (e.g., apertures 118D2, 118D5 and 118D10) comprise material that is substantially transparent to the impinging laser beam, and extend from transparent plastic front layer 132D to sensor sheet 181D (i.e., through luminescent regions 135C2, 135C5 and 135C10, and through photocathode layer 134D). The passed beam path portions are detected by sensor sheet 181D and utilized in the manner described above.

Figure 7:
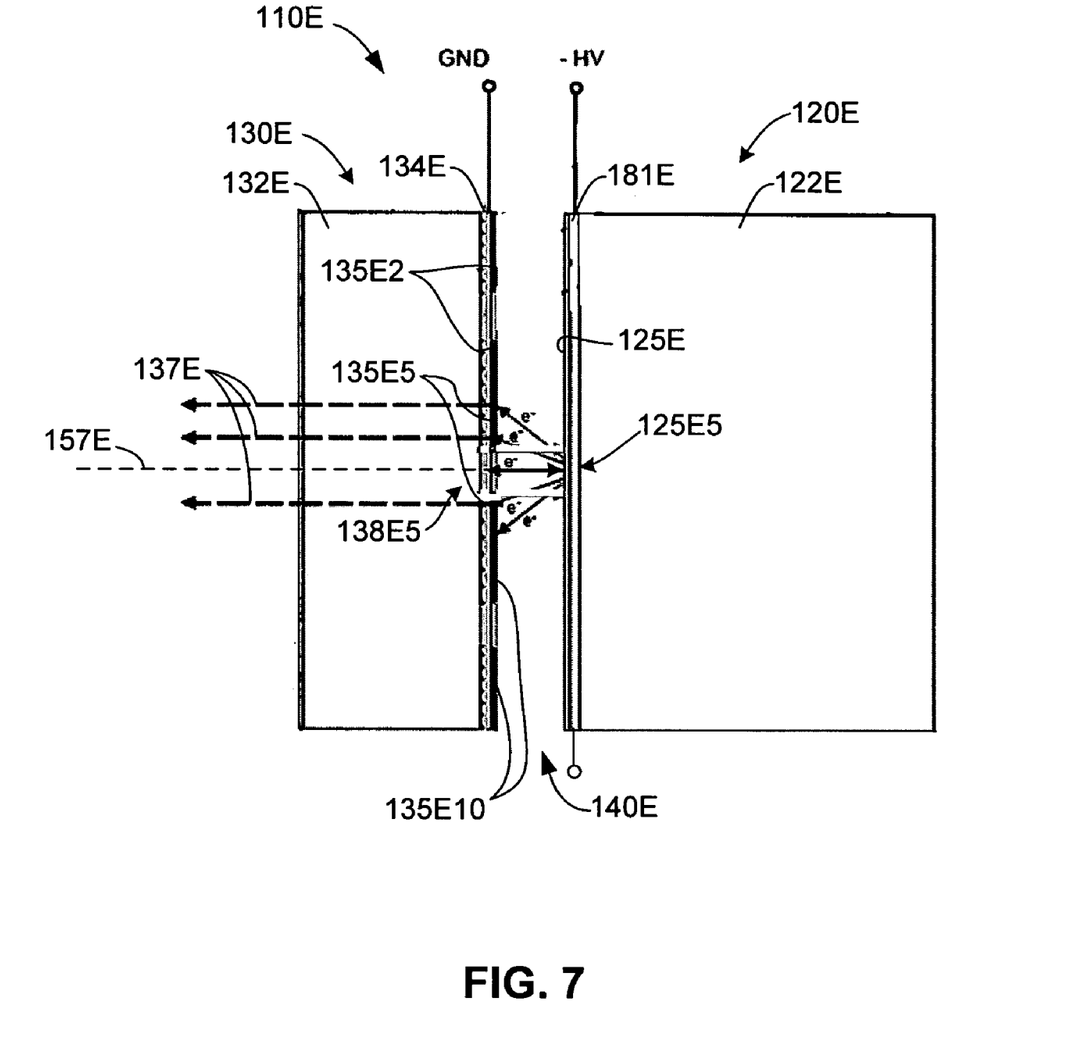
FIG. 7 is a cross-sectional side view showing an emissive screen according to another embodiment of the present invention.

FIG. 7 is a cross-sectional side view showing an "emissive" luminescent screen 110E formed in accordance with yet another embodiment of the present invention. In this embodiment, a PSD sensor sheet 181E is utilized to form a photon-multiplication device that facilitates the production of large area displays by generating relatively high light emissions from luminescent regions 135E2, 135E5, and 135E10 (which are formed and arranged substantially as shown in FIG. 6(A)).

Emissive luminescent screen 110E generally includes a photocathode plate 120E separated from photoanode plate 130E by a vacuum region 140E, with a PSD sensor sheet 181E mounted on photocathode plate 120E as shown. In one embodiment, photocathode plate 120E includes a glass pane 122E having a thickness of 1 mm, photoanode plate 130E includes a glass pane 132E having a thickness of 0.5 mm, and vacuum region 140E has as width of 0.1 to 0.3 mm. Photocathode plate 120E also includes the PSD (conductor) layer 181E formed on the inside surface of glass pane 122E, and a photocathode material layer 125E formed on sensor sheet 181E. Photoanode plate 130E also a conductor layer 134E formed on the inside surface of glass pane 122E, a photoanode layer 134E, and blue, green, and red luminescent regions 135E2, 135E5 and 135E10 printed or otherwise formed on photoanode layer 134. A high (negative) voltage –HV (e.g., –500V to –500V or higher if possible without arcing or breakdown) is applied to PSD sensor 181E, and conductor layer 134E is connected to ground, thus producing an electric field (E-field) in vacuum region 140. Instead of activating the luminescent material of a selected pixel directly, laser beam 157E passes through the central apertures (e.g., aperture 138E) to activate a region of photocathode layer 125E (e.g., region 1254E5) located adjacent to the selected pixel. Activated photocathode region 125E5 generates free electrons (indicated by "e$^-$") that are accelerated by the E-field and impact luminescent material 135E5 of the selected pixel with substantially higher energy than that of laser beam 157E, thereby producing visible (e.g., red) light 137E with an optical gain. Additional features an aspects associated with "emissive" luminescent screens is disclosed in co-owned and co-pending U.S. patent application Ser. No.11/016,242, entitled "EMISSIVE SCREEN DISPLAY WITH LASER-BASED EXTERNAL ADDRESSING", which is incorporated herein in its entirety.

Figure 8:
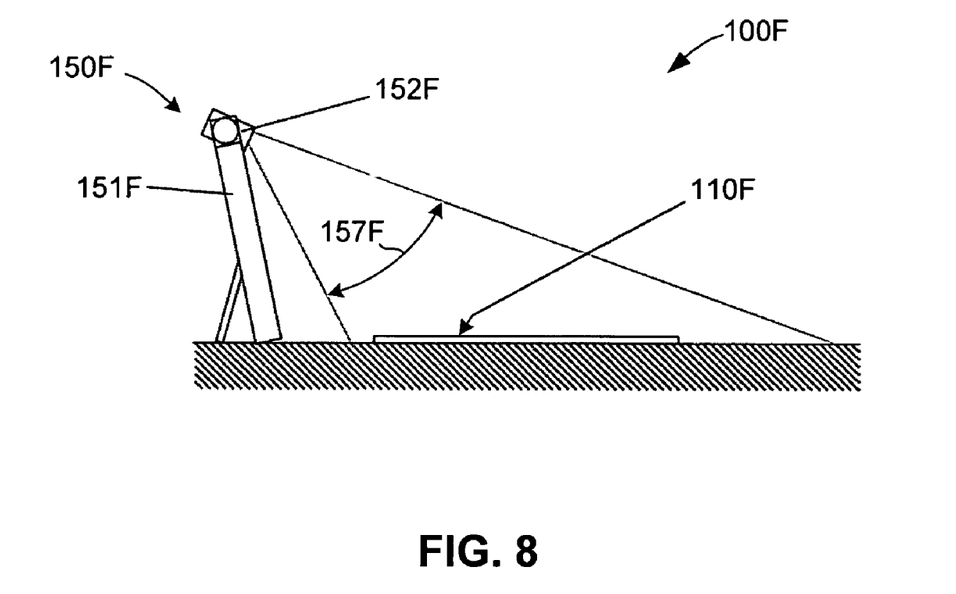
FIG. 8 is a side view showing an electronic device including a small area display according to another embodiment of the present invention.
Figure 9:
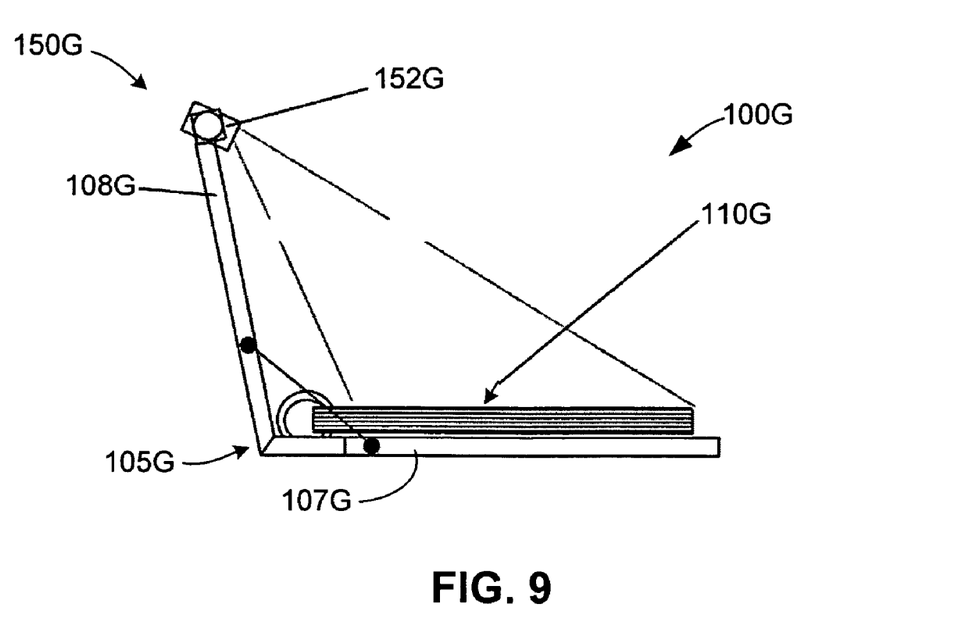
FIG. 9 is a side view showing an electronic device including a small area display according to another embodiment of the present invention.

While the present invention has been described above with reference to certain large-screen applications, the non photon-multiplied versions of the present invention may be best suited to small area, portable embodiments such as those described below. For example, FIG. 8 shows a display apparatus 100F in which laser scanning system 152F (e.g., an expansion module with a UV scanner on a swivel head) is mounted onto a portable electronic device 151F (e.g., a personal digital assistant (PDA) or a cell phone). A luminescent screen 110F, which is placed in the area swept by laser beam 157F, is formed as a flat sheet that includes one of the PSD technologies discussed above. Beam 157F is self aligned to screen 110F by way of timing/location data transmitted from screen 110F to scanner 152F (e.g., by wires or IR LED transmission). Many other form factors are possible, e.g., the display sheet may be foldout, built-in, or a flip down cover of a PDA. FIG. 9 shows another portable display apparatus 100G that includes a foldable structure 105G (e.g., in a "book" or "binder" format) having several screens 110G mounted on a first cover 107G and a laser system 150G mounted on a second cover 108G, thus forming a "book-of-displays". A scanner 152G of the associated laser system 150G is built into the opposing cover 151G of the book. Each screen "page" 110G would be coded as to properly identify the image data to be projected by laser scanner 152G when the pages are flipped (e.g., movies, web pages, MSOffice documents, etc., all "open" at the same time, on different physical pages that can be flipped through). Further extensions are possible with addition of a tactile sensing coating (existing technology) on each sheet. The pages would now become fully interactive: draw, point, click, drag, drop, cut, paste in-page and between pages, virtual keyboard projection, etc. Pages can be added, etc.

Although the present invention has been described with respect to certain specific embodiments, it will be clear to those skilled in the art that the inventive features of the present invention are applicable to other embodiments as well, all of which are intended to fall within the scope of the present invention. For example, although rectangular and circular apertures are described herein for passing laser light to the PSD sensor sheet, other aperture shapes and positions can be used with substantially the same effect.

The invention claimed is:

1. A display apparatus comprising:
   a luminescent screen including a plurality of pixels, each pixel including a luminescent region comprising a luminescent material;
   a position sensitive detector including a sensor mounted adjacent to the luminescent screen, and a detector circuit connected to the sensor; and
   a laser system for directing a laser beam onto the luminescent screen and the sensor, and for controlling the laser beam in response to data received from the detector circuit such that the laser beam activates selected pixels of the plurality of pixels to produce a desired image,
   wherein the data is generated in response to a detected position of the laser beam on the sensor,
   wherein the sensor and detector circuit comprise means for determining a location of the laser beam relative to luminescent screen.

2. The display apparatus according to claim 1, wherein the laser system includes means for scanning the laser beam in a predetermined pattern across a surface of the luminescent screen, and for controlling the laser beam to transmit a relatively high energy pulse to each of the selected pixels.

3. The display apparatus according to claim 1,
   wherein the luminescent screen includes first pixels having red luminescent regions, second pixels having green luminescent regions, and blue pixels having blue luminescent regions, and
   wherein the laser system includes a first laser for addressing the first, second and third pixels.

4. The display apparatus according to claim 3, wherein the laser beam generated by the first laser has a predetermined wavelength in one of the visible light spectrum, the near-ultraviolet spectrum, and the ultraviolet spectrum.

5. The display apparatus according to claim 3, further comprising a second laser for addressing the first, second and third pixels, wherein the first and second lasers generate laser beams having a single predetermined wavelength.

6. The display apparatus according to claim 1, wherein each luminescent region comprises at least one of fluorescing nano-particles and phosphorus.

7. The display apparatus according to claim 1, wherein the laser system includes:
   means for scanning the laser beam along parallel scan paths,
   means for comparing the data received from the detector circuit with image source data including a pixel location of a selected pixel, and
   means for modulating the laser beam from a relatively low power to a relatively high power when the timing/location data indicates that the laser beam is at the pixel location of the selected pixel, thereby causing the selected pixel to emit visible light.

8. A display apparatus comprising:
   a luminescent screen including a plurality of pixels, each pixel including a luminescent region comprising a luminescent material;
   a position sensitive detector including a sensor mounted adjacent to the luminescent screen, and a detector circuit connected to the sensor; and
   a laser system for directing a laser beam onto the luminescent screen and the sensor, and for controlling the laser beam in response to data received from the detector circuit such that the laser beam activates selected pixels of the plurality of pixels to produce a desired image, wherein the data is generated in response to a detected position of the laser beam on the sensor,
   wherein the sensor comprises one or more elongated strips extending parallel to one or more edges of the luminescent screen.

9. The display apparatus according to claim 8, wherein the one or more sensor strips comprises a first sensor strip extending along a first side edge of the luminescent screen, and a second sensor strip extending along a second side edge of the luminescent screen.

10. The display apparatus according to claim 8, wherein the sensor comprises a sensor sheet mounted such that the luminescent screen is between the laser system and the sensor sheet.

11. The display apparatus according to claim 10, further comprising a plurality of electrodes connected between edges of the sensor sheet and the detector circuit.

12. The display apparatus according to claim 10,
    wherein the luminescent screen includes non-luminescent border regions located between the luminescent regions of each adjacent pair of pixels, and
    wherein the non-luminescent border regions define slits for passing said laser beam to the sensor sheet.

13. The display apparatus according to claim 10, wherein the luminescent regions of each pixel defines a central aperture for passing said laser beam to the sensor sheet.

14. The display apparatus according to claim 10, wherein the luminescent screen further comprises:
    a photocathode plate including a photocathode material layer formed on the sensor sheet; and
    a photoanode plate including said luminescent regions of said plurality of pixels,
    wherein the photocathode plate is separated from the photoanode plate by a vacuum region; and
    wherein the luminescent screen includes means for generating an electric field in the vacuum region such that electrons freed from the photocathode material layer by the laser beam are accelerated into the luminescent regions of selected pixels.

15. The display apparatus according to claim 1, wherein the laser system is mounted onto a portable electronic device.

16. The display apparatus according to claim 1, wherein the luminescent screen is mounted onto a first cover of a foldable structure, and the laser system is mounted onto a second cover of the foldable structure.

17. A display apparatus comprising:
    a luminescent screen including a plurality of pixels, each pixel including a luminescent region comprising a luminescent material;
    laser means for directing a laser beam onto the luminescent screen; and
    means for detecting a location on the luminescent screen impinged by the laser beam, and for transmitting to the laser means timing and location data indicating the detected location of said laser beam and a time at which the laser beam is detected at the detected location.

18. The display apparatus according to claim 17, wherein the laser means further comprises means for controlling the laser beam in response to said timing and location data received from the detector circuit such that the laser beam activates selected pixels of the plurality of pixels to produce a desired image.

* * * * *